United States Patent [19]

Meinicke

[11] 4,265,489
[45] May 5, 1981

[54] ELECTROPNEUMATIC BRAKE FOR RAIL VEHICLES

[75] Inventor: Hans-Peter Meinicke, Potomac, Md.

[73] Assignee: Knorr-Bremse GmbH, Munich, Fed. Rep. of Germany

[21] Appl. No.: 2,961

[22] Filed: Jan. 11, 1979

[30] Foreign Application Priority Data

Jan. 17, 1978 [DE] Fed. Rep. of Germany ....... 2801778

[51] Int. Cl.³ ............................................. B60T 13/74
[52] U.S. Cl. ...................................... 303/3; 303/22 A
[58] Field of Search ................ 303/3, 7, 15, 16, 22 A, 303/23 A, 20, 71

[56] References Cited

U.S. PATENT DOCUMENTS

| | | | |
|---|---|---|---|
| 3,730,597 | 5/1973 | Pickert | 303/22 A |
| 4,073,541 | 2/1978 | Nagase | 303/3 |

*Primary Examiner*—Trygve M. Blix
*Assistant Examiner*—Reinhard J. Eisenzopf
*Attorney, Agent, or Firm*—Edmund M. Jaskiewicz

[57] ABSTRACT

In an electropneumatic brake a relay valve is connected between a source of pressure fluid and a brake cylinder which may be spring-loaded or direct acting in order to regulate the pressure in the brake cylinder. An emergency brake valve is connected to a means for producing a brake signal to shut off a faulty brake signal and actuated in the absence of a vehicle load responsive signal. A pressure control valve is connected to the emergency brake valve, to relay valve and to a device for producing a vehicle load-responsive signal in order to control a load-responsive pressure in the brake cylinder in such a manner that in the absence of a vehicle load-responsive signal and upon actuation of the emergency brake valve full braking is applied by the brake cylinder independent of the vehicle load.

13 Claims, 4 Drawing Figures

ELECTROPNEUMATIC BRAKE FOR RAIL VEHICLES

The present invention relates to an electropneumatic brake for rail vehicles and the like, more particularly, to mechanism in the brake which functions to introduce full braking in the absence or failure of a vehicle load responsive signal.

Electropneumatic brakes, particularly for rail vehicles and the like, have been provided with a mechanism for producing a signal which is responsive to the load of the vehicle. This load signal is then employed to modify or influence a braking signal so that the braking signal is a function of the vehicle load. The load signal mechanism generally controls a relay valve as a load responsive pneumatic precontrol signal and the relay valve is generally connected between a container of fluid under pressure, such as compressed air, and at least one brake cylinder so that the relay valve regulates the pressure in the brake cylinder. The brake cylinder may be of the spring-loaded or direct-acting type.

Controlling an air braking system as a function of vehicle load is particularly important in order to obtain an optimum braking operation. Such a load-responsive signal can be formed by pneumatic shock absorbers or by a pneumatic pressure cell such that this signal then influences the braking requirement on the electrical side of the electropneumatic brakes. The degree of braking which may be desired at a particular time is generally translated electrically into a braking signal.

The problem now exists in such an electropneumatic brake system that upon the failure of an electrical load-responsive braking signal even under no-load or partial load of the vehicle, a full braking is triggered by the emergency brake valve which results in an overbraking of the vehicle to produce known disadvantageous effects and phenomena.

It is therefore the principal object of the present invention to provide an improved electropneumatic brake of the type described herein wherein the above-discussed problem is avoided and where a fully loaded vehicle is safely braked even upon the failure of the load-responsive signal.

The present invention essentially provides a pressure control valve which is connected to a relay valve and to an emergency braking valve which shuts off a faulty braking signal to the pressure control valve. In the event of a failure of a load-responsive signal and upon the actuation of the emergency brake valve overbraking is avoided in a spring-loaded brake in the brake cylinder by the pressure control valve controlling a load-responsive residual pressure maintained in the brake cylinder. In the case of a direct-acting brake the pressure control valve controls a load-responsive pressure. The pressure control valve actually introduces a full braking in the event of a failure of the load-responsive signal.

Preferably, a pneumatic load-responsive signal on the one hand acts against a pressure/voltage transducer whch produces an infinitely variable load-responsive pneumatic precontrol pressure signal from an electrical brake signal and on the other hand acts against the pressure control valve. Upon actuation of the emergency brake valve in the case of a spring-loaded brake, the intake at the pressure control valve for the braking signal is vented and in the case of a direct-acting brake upon actuation of the emergency brake valve the intake to the pressure control valve for the braking signal is connected to the air supply container.

According to one aspect of the present invention there may be provided in an electropneumatic brake, particularly for rail vehicles, relay valve means connected between a source of pressure fluid and a brake cylinder for regulating pressure in the brake cylinder. An emergency brake valve is connected to means for producing a braking signal to shut off a faulty braking signal to the pressure control valve. The emergency brake valve is actuated in the absence or failure of a vehicle load-responsive signal. Pressure control valve means is connected to the emergency brake valve, to the relay valve and to the vehicle load-responsive signal producing means for controlling a load-responsive pressure in the brake cylinder such that in the absence of a vehicle load-responsive signal and upon actuation of the emergency brake valve full braking is applied by the brake cylinder independent of the vehicle load.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
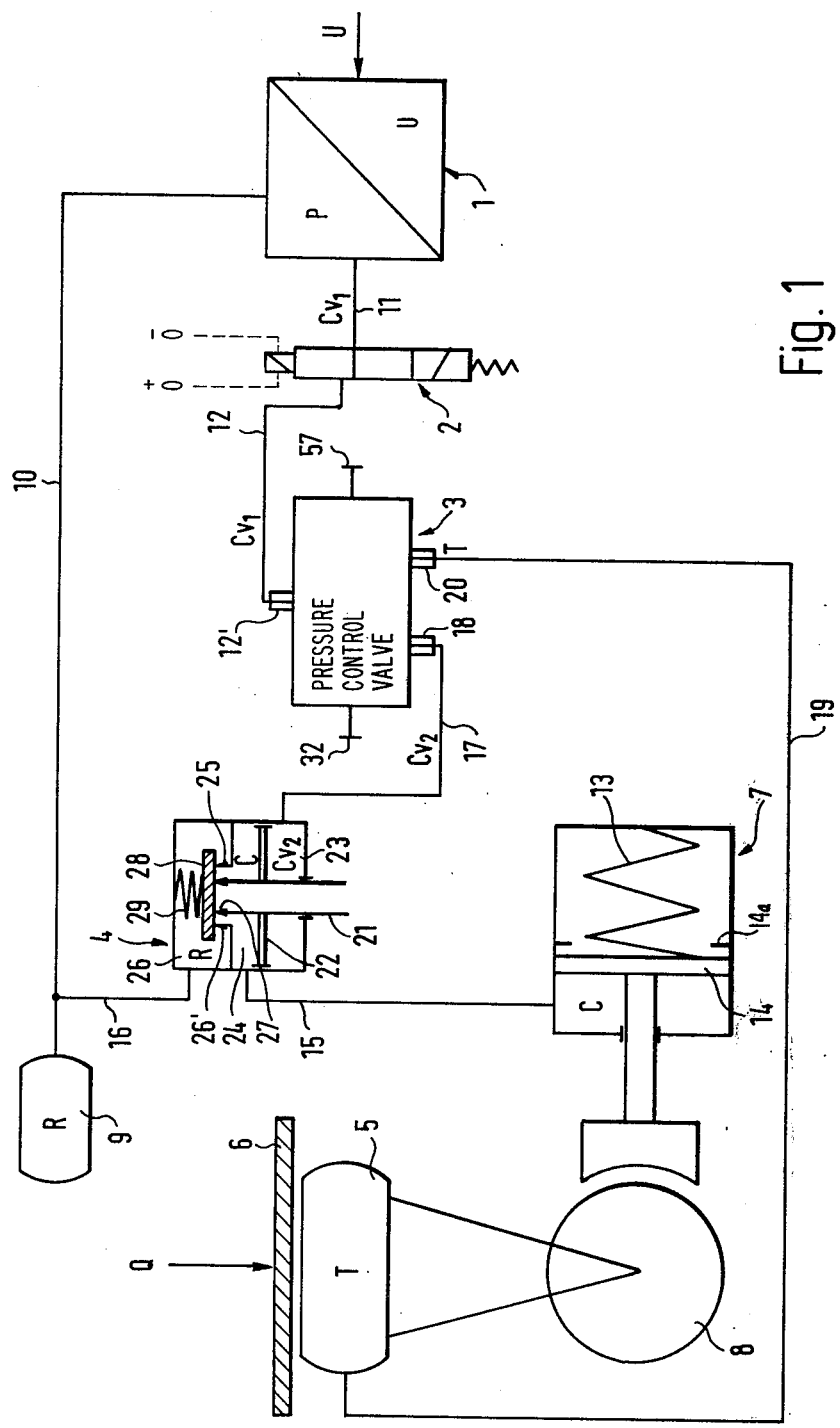
FIG. 1 is a diagrammatic drawing of the pneumatic portion of an electropneumatic spring-loaded braking system according to the present invention.

The pneumatic portion of an electropneumatic brake system as shown in FIG. 1 comprises a pressure/voltage converter or transducer 1 to which is connected an emergency brake valve 2. A pressure control valve 3 is connected to the emergency brake valve 2 and to a relay valve 4. An air spring bellows 5 acts as a component of an air suspension system between a vehicle frame 6 and wheel axles upon which is a wheel 8 which is braked by a spring-loaded brake cylinder 7. A reservoir for compressed air 9 is also connected to the relay valve 4 and over an air line 10 to the converter 1.

The analogue converter 1, which is not shown in detail but is known in the art, converts an electrical brake control signal U which is determined by the operator to select the degree or type of braking desired into a load-responsive braking signal transmitted as a preliminary control pressure $C_{v1}$ over an air line 11 to the emergency brake valve 2. The control pressure $C_{v1}$ is thus analogous to the electrical braking signal U and is virtually infinitely variable. The emergency brake valve 2 in one switching position connects air line 11 to an air line 12 whicn in turn is connected to the intake 12' of the pressure control valve 3. In the other switching position of the emergency brake valve 2, the air line 11 is shut off and the air line 12 is vented to the atmosphere.

The emergency brake valve 2 is illustrated in FIG. 1 schematically as a solenoid valve which interrupts the connection of the pressure control valve 3 to the analogue converter 1 and thus connects air line 12 to the atmosphere should any malfunctioning or fault occur in the electronic portion of the electropneumatic control which would produce an incorrect or faulty load-responsive brake control signal.

The function of relay valve 4 is to selectively regulate the air pressure C in the brake cylinder 7. Increase of the pressure C in the brake cylinder 7 releases the brake. Decreasing pressure C causes the braking force supplied by the brake cylinder 7 to be progressively increased by the gradual release of stored energy of the spring 13. Full braking is achieved by the brake cylinder 7 when pressure C is at 0. The brake is completely released when piston 14 is pressed back against its stop 14a by pressure C acting against the force of spring 13.

The pressure C in the brake cylinder 7 is controlled over an air line 15 connected to the relay valve 4. The relay valve 4 is connected over an air line 16 to the air supply reservoir 9 and over air line 17 to a second intake 18 on the pressure control valve 3. The spring bellows 5 is connected over an air line 19 to an intake 20 on the pressure control valve 3.

The relay valve 4 includes an axially movable tube 21 to which is affixed a piston 22 which divides a valve chamber into a chamber 23 connected to the air line 17 and a second chamber 24 connected to the air line 15. The chamber 24 is separated from a further chamber 26 by a housing wall 25 and the chamber 26 is connected to the air line 16. The housing wall 25 is provided with a central opening which forms an outer valve seat 26′ having a greater diameter than the tube 21 which is disposed in the central portion of the central opening. The upper edge of tube 21 forms an inner valve seat 27.

A valve member 28 in the form of a plate is positioned in chamber 26 and is stressed by a spring 29 into the closing direction of the double valve 26′ and 27. The tube 21 extends outwardly through an opening in the wall of the relay valve 4 forming the chamber 23 and is sealingly and slideably movable within this opening.

In the pressure-less state, valve member 28 is seated on the outer valve seat 26′ to close off chamber 26 from chamber 24. If the brake cylinder 7 is fully vented or exhausted to the atmosphere, then the wheel 8 is subjected to full braking force as applied by the braking cylinder spring 13. In order to release the brake, chamber 23 of relay valve 4 is filled with air under pressure over air line 17. Piston 22 will then be moved upwardly to lift valve member 28 from the outer valve seat 26′. At the same time, the inner valve seat 27 will remain in contact with valve member 28 to close this valve. Air reservoir pressure R is then introduced over air line 16 into chamber 26, through the open valve seat 26′, into chamber 24 and through air line 15 into the brake cylinder 7 as result of which the piston 14 is moved in the release direction against spring 13.

When the pressure C in the brake cylinder, which also prevails on chamber 24, is equal to the pressure $C_{v2}$ in chamber 23 established over line 17, valve member 28 will close the outer valve seat 26′ to interrupt the connection of the air reservoir 9 to the brake cylinder 7.

As can be seen in FIG. 1, if the pressure $C_{v2}$ in chamber 23 is reduced, the piston 22 will be urged downwardly by the prevailing pressure C in chamber 24 so that the inner valve seat 27 will be disengaged from valve member 28. Air will thus be drawn off into the ambient atmosphere through tube 21, open valve seat 27, chamber 24 and line 15 from the brake cylinder until a pressure equilibrium has been established in chambers 23, 24 of the relay valve 4.

The pressure T which is produced by the spring bellows 5, only one of which is illustrated in FIG. 1, corresponds to the actual load weight Q of the vehicle as known in the art. The pressure T is transmitted through line 19 to the pressure control valve 3.

In an emergency braking operation, the pressure control valve 3, which is connected between the emergency brake valve 2 and the relay valve 4, has the function of terminating the increase in pressure $C_{v2}$ in the chamber 23 of the relay valve 4 responsive to the magnitude of the pressure T in line 19.

In the event of any malfunction in the electropneumatic brake control such that the emergency braking valve 2 is connected to vent the air line 12 to initiate an emergency braking operation, the pressure control valve 3 reduces the pressure $C_{v2}$ in chamber 23 of the relay valve 4 to a residual pressure dependent upon the vehicle load. The vehicle is thus braked as a function of its load and there is no overbraking. However, precautionary measures should be taken to assure that an undesired increase of the shut off pressure $C_{v2}$ in the relay valve 4 does not initiate a release of the brake. Also, in the event of a failure or absence of the pressure T because of any malfunction in the air spring bellows suspension system, the pressure control valve 3 should vent the shut off pressure $C_{v2}$ in the relay valve to the atmosphere so that full braking can be applied with maximum braking force independent of the actual vehicle load.

Figure 1A:
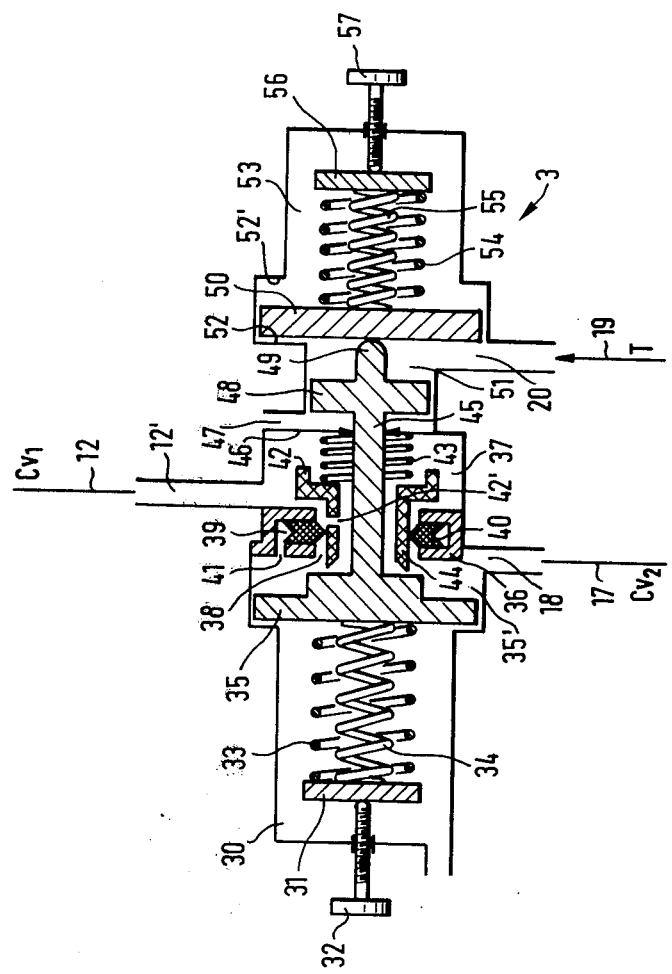
FIG. 1a is a diagrammatic cross-sectional view of the pressure control valve employed in the brake system of FIG. 1.

The pressure control valve 3 as shown in FIG. 1a has a primary chamber 30 vented to the atmosphere and has a spring plate 31 supported on an adjusting screw 32 which can be actuated by a suitable handle from a position outside of the valve 3. The plate 31 supports two prestressed springs 33 and 34 which springs also engages a piston 35 which divides the chamber 30 from a second chamber 35′. The chamber 35′ is connected through connection 18 to the $C_{v2}$ air line 17. A fixed housing wall 36 separates the second chamber 35′ from a third chamber 37 which is connected through the connection 12′ to the $C_{v1}$ air line 12. The housing wall 36 also functions as a stop for the piston 35 and has a central opening 38 in which there is an inner annular T-slot 39 in which is positioned a sealing ring 40 which functions as a check valve in a manner to be described. The T-slot 39 has an opening 41 therein to the chamber 35′. The inner circumference of sealing ring 40 sealingly engages the outer peripheral surface of a tubular valve body 42 which is axially moveable in the opening 38 against the force of a spring 43 supported in the chamber 37. When the pressure control valve 3 is in a pressure-less state, the valve body 42 is shifted to the left by the spring 43 until a flanged portion of valve body 42 abuts the wall 36. The left end of valve body 42 which in this position projects into the chamber 35′ has a valve seat 44 thereon engageable with the piston 35.

Extending axially from the piston 35 is a piston rod 45 which passes through the tubular valve body 42 and in sliding and sealing engagement with an opening in a housing wall 46 which separates the chamber 37 from a chamber 47 which is open to the atmosphere. One surface of the chamber 47 is defined by a piston 48 which is fixed on the piston rod 45 and axially spaced from piston 35 so that the pistons 35 and 48 form a graduated double piston unit. There is a piston rod extension 49 projecting axially from piston 48 the end of which is engageable with a piston 50. The pistons 48 and 50 define between them a chamber 51 which is connected through the connection 20 to the air line 19. The piston 50 is movable between two stops 52 and 52′ located within a chamber 53. Two springs 54 and 55 are supported on the piston 50 and are prestressed to a selected degree by means of a valve plate 56 engaged by an adjustment screw 57 extending outwardly of the valve 3 so as to be actuable from the exterior thereof.

The spring assembly 54, 55 acting upon the piston 50 is adjusted so as to exert a greater force than the spring assembly 33, 34 acting upon the piston 35 so that in the pressure-less state the piston unit 35, 48 is shifted to the left as viewed in FIG. 1a. The piston 35 is also moved to the left by the valve seat 44 of the valve body 42 which is pressed against a stop by the spring 43 with sufficient spring force to close the valve 35,44.

The pressure control valve 3 operates as follows:

In the initial filling operation, the chamber 51 between the pistons 48 and 50 is subjected to air under pressure from the air bellows pressure T over line 19 and through the intake 20. The compressive force of the spring assembly 54, 55 is adjusted by the adjustment screw 57 such that when air bellows pressure T indicates no load, the spring forces acting on piston 50 and the oppositely directed force $T_{no\ load}$ are in equilibrium. Since the force exerted by the spring assembly 33, 34 is greater than the pneumatic force acting upon piston 48, the piston unit 35,48 urges the piston 50 to the right against springs 54, 55. The piston 35 will thus be positioned with its valve seating surface abutting the housing wall 36 and the valve body 42 will be urged to the right against the force of the valve spring 43.

In operation of the vehicle, which may be one of a train of vehicles, under no load conditions, the valve 3 is subjected to a pressure $C_{v1}$ through line 12 to fill the valve chamber 37. Air under pressure passes through the inner bore hole 42' in the valve body 42 and the annular T-slot 39 through opening 41 into the chamber 35' after overcoming the resistance offered by the two right hand resilient sealing lips of the dovetail-shaped sealing ring 40. In the relatively small volume of chamber 35' which contains the $C_{v2}$-air, the pressure in chamber 35' will increase to a level which will be only slightly different from the $C_{v1}$ pressure in chamber 37. Upon reaching a certain predetermined pressure valve for the pressure $C_{v2}$, the piston unit 35,48 is lifted from the valve seat 44 against the force of the springs 33,34.

If the unload conditions remain unchanged, the piston 50 will remain in its equilibrium position. The valve body 42 will be positioned against its stop on the wall 36 by the force of the spring 43. The valve seat 44 will be open from piston 35 to provide an uninterrupted connection between chambers 37 and 35' which has the effect of connecting the air lines 12 and 17. Upon an increase in the $C_{v1}$-pressure, the piston 35 will be moved further to the left to provide a maximum opening from the valve seat 44. The compressed air passes through the open valve seat 44 and air line 17 into the chamber 23 of the relay valve 4 as result of which the piston 22 is lifted and the valve 26' is opened. The R air then passes from the reservoir 9 through the chamber 24 into the brake cylinder 7 until a pressure is built up in the brake cylinder and until the pressure in chamber 24 is in equilibrium with the pressure $C_{v2}$ as adjusted in chamber 23. The brake is thus released dependent upon and a function of the adjusted pressure C in the brake cylinder.

If the vehicle is to be subjected to service braking under no-load conditions, then the pressure $C_{v1}$ is reduced over the analogue converter 1 in lines 11,12 to a braking value which is a function of the load. Reducing pressure in chambers 35' and 37 causes the piston unit 35,48 to be moved to the right as viewed in FIG. 1a. A few pressure equilibrium is then formed between the $C_{v2}$ and the $C_{v1}$ pressures. The force of the spring assembly 33,34 is so selected that there is no sealing effect between the valve body 42 and piston 35. In this manner, with a repeated increase of the pressure $C_{v1}$ to release the brake, the path over the open valve seat 44 is open at the inception of the release operation.

Should any error or malfunction occur within the electronic control circuit of the electropneumatic brake as result of which a brake signal U which is incorrect as a function of the load is supplied to the converter 1, the emergency brake valve 2 is then connected to vent air line 12 so that the pressure $C_{v1}$ is reduced to 0. This reduction in $C_{v1}$ pressure causes the piston unit 35,48 to move to the right and the piston 35 closes the valve seat 44 on the valve body 42 after the pressure $C_{v2}$ has dropped slightly below the value as corrected for load. In this closed position of the piston 35 no contact occurs between the piston rod 45,49 and the piston 50. A predetermined $C_{v2}$ pressure is thus shut off by the valve closed by the piston 35 with the result that a corresponding C pressure remains closed off in the brake cylinder. Thus, under no-load conditions, the vehicle is not overbraked by a rapid braking operation introduced by the emergency brake valve 2.

If the vehicle is under full load, the pressure T in line 19 entering into chamber 51 moves the piston 50 against the force of springs 54,55 to the stop 52' as opposed to empty or no-load condition wherein the piston 50 is against stop 52. The force acting upon the piston 48 is force applied in the opposite direction by the springs 33,34 just before the closing of the valve seat 44. Thus, a connection remains between $C_{v1}$ line 12 and $C_{v2}$ line 17 independent of the type of braking operation including a rapid braking operation wherein the pressure $C_{v1}$ is 0. Under such a rapid braking operation a residual pressure $C_{v2}$ dependent on the vehicle load is shut off by the pressure control valve 3 so that a corresponding load-dependent pressure C in the brake cylinder counteracts the full braking force of the brake piston 14.

However, should the pressure T of the air spring bellows 5 decreases to 0 because of any fault or malfunction, then the pressure $C_{v1}$ in line 12 will be vented by the emergency brake valve in the same manner as when any malfunction or fault occurs in the electronic control circuit of the electropneumatic brake control. However, since the spring assembly 54,55 exerts a stronger force than the spring assembly 33,34, the piston 35 is kept in its open position from the valve seat 44 by the action of piston 50 against the piston rod extension 49. As result, the connection between lines 12 and 17 remains open independent of the vehicle load and the $C_{v1}$ and $C_{v2}$ pressures are reduced to 0. It is thus apparent that in the event of any malfunction in the air spring bellows system, the vehicle will be braked with full braking force independent of the vehicle load.

In the interests of safety, such an overbraking of an empty vehicle can be accepted. However, it is pointed out that in general an anti-wheel slip or non-skid apparatus is employed which prevents such an overbraking with locked wheels. This anti-skid device is not described here but is known in the art and prevents locking of the vehicle wheels under such braking conditions. Such an application of the anti-wheel skid device increases the braking path but this increase is also acceptable because the danger of locking of the wheels decreases with the degree of load of the vehicle, because of the number of persons to be protected and because the increase in the braking path brought about by the application of the anti-wheel skid device is not much greater than with a braking against a shut off $C_{v2}$ pressure in the relay valve.

Further, the pressure regulating valve 3 assures that any increase in the shut off $C_{v2}$ pressure because of leakage from outside sources or because of thermal compression after a rapid drop in $C_{v2}$ pressure does not bring about a release of the brake since a $C_{v2}$ pressure increase brings about an opening of the valve seat 44 which thus causes $C_{v2}$ air to be drawn off.

Because of this possibility of the drawing off of $C_{v2}$ air, a non-return or check valve must be provided between the chambers 35' and 37. This check valve function is provided by the sealing ring 40 in the present embodiment. It is particularly advantageous to construct this sealing ring 40 as a check valve because a check valve must be employed for sealing off the spring-loaded valve body 42. A non-spring-loaded valve body 42 would cause considerable wear of the sealing surfaces on piston 35.

There is a time delay which occurs between the time of a rapid braking and the release of the brake. This delay which occurs because the switching threshold of the check valve must first be overcome to release the brake, is also accepted since safety in braking operations has precedence over any such time delay or loss.

Figure 2:
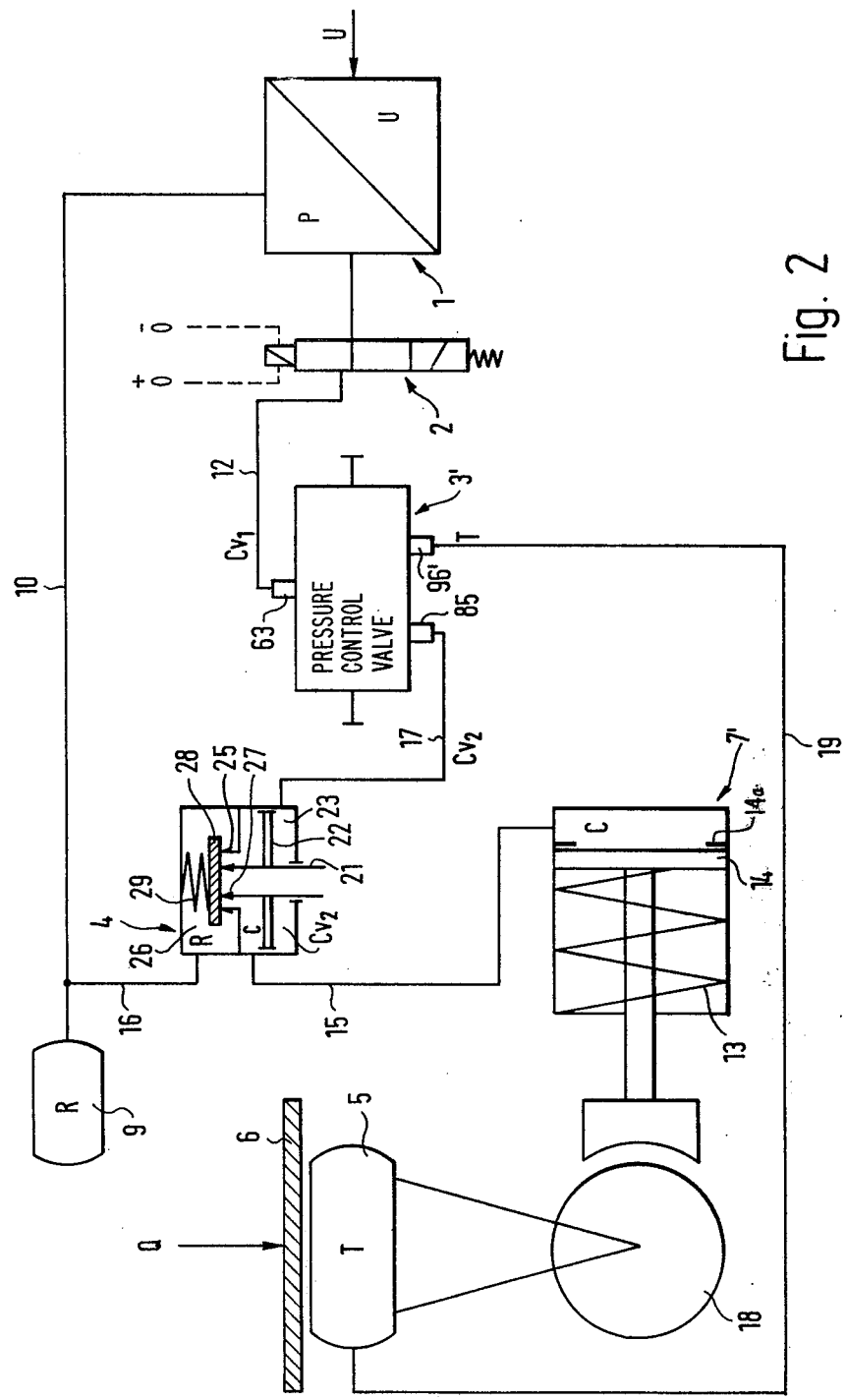
FIG. 2 is a view similar to that of FIG. 1 but of a direct-acting braking system.
Figure 2A:
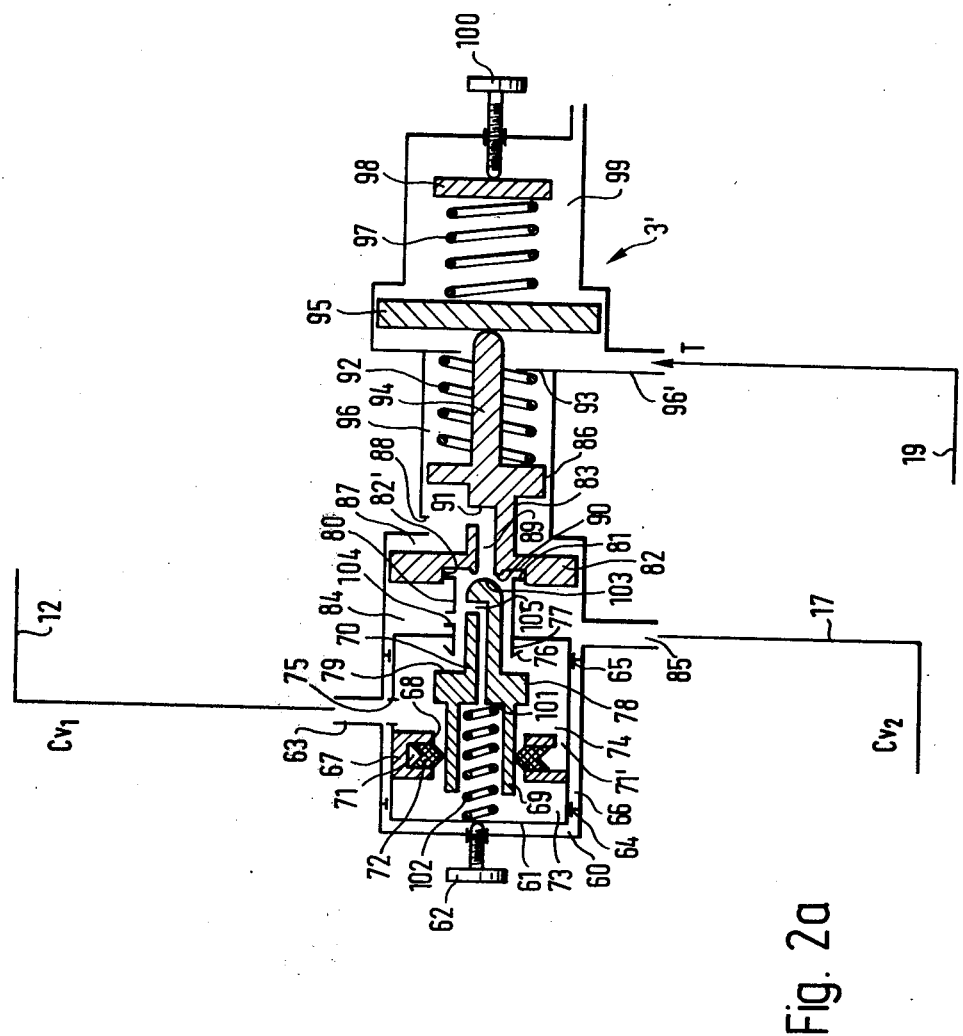
FIG. 2a is a view similar to that of FIG. 1a but of the pressure control valve of FIG. 2.

Proceeding next to FIGS. 2 and 2a, the brake cylinder 7' and the load-responsive pressure control valve 3' are different than the corresponding elements in FIGS. 1 and 1a. In brake cylinder 7' the piston 14 is moved into braking position by a pneumatic pressure C acting against the force of return spring 13. Decreasing the pressure C enables the spring 13 to return the piston to the release position. It is to be noted that in the spring-loaded brake of FIG. 1 the pneumatic braking signal $C_{v1}$ from the analogue converter is inversely proportional to the braking force, in the direct brake of FIG. 2 the corresponding pneumatic brake signal is directly proportional to the braking force. The functions of the analogue converters 1, of the relay valves 4 and the air spring bellows system 5 are the same in both embodiments of FIGS. 1 and 2. However, when the emergency brake valve 2 is actuated in FIG. 2, the $C_{v1}$ pressure line 12 is not vented but is connected to the supply reservoir 9.

The operation of the embodiment of FIG. 2 can best be understood by considering the construction and operation of the load-responsive pressure control valve 3' shown in FIG. 2a. The pressure control valve 3' comprises a valve housing having a primary chamber 60 in which is positioned a axially movable valve sleeve 61 adjustable from the exterior of the valve 3' by means of an adjustment screw and handle 62. The chamber 60 has a first inlet connection 63 connected to the $C_{v1}$ air line 12. The intake connection 63 is positioned between two sealing rings 64 and 65 which seal an annular space 66 defined between these sealing rings, the inner surface of chamber 60 and the outer surface of the valve sleeve 61.

Within the valve sleeve 61 there is a solid annular inner wall section 67 having a central cylindrical opening 68 therethrough within which is received an open end 69 of a tubular valve member 70 which is axially movable. Within the wall section 67 there is provided an annular T-slot 71 within which is seated a sealing ring 72 which forms a seal between the tubular valve member 70 and the cylindrical opening 68 and which functions as a check valve similar to the sealing ring 40 in FIG. 1 which will be subsequently described in more detail. The wall section 67 with the movable end 69 of the tubular valve member 70 divides the interior of the valve sleeve into two chambers 73 and 74 such that the valve end 69 extends into chamber 73 while the chamber 74 has at least one opening 75 to the annular chamber 66. One side of the annular T-slot 71 is connected to the valve sleeve chamber 74 through an opening 71'.

In one end of the valve sleeve chamber 74 there is a central opening 77 upon which is formed a valve seat 66 through which the tubular valve member 70 extends with annular clearance. Within the valve sleeve chamber 74, the tubular valve member 70 has an outer flange 78 one surface of which, 79, is engageable with the valve seat 76 to form a valve 76, 79.

A tubular element 80 extends outwardly from the opening 70 of valve sleeve 61 and has a free end 81 which is fixedly attached within a recess 82' in the large cross-sectional area piston 82 of the stepped piston unit 83. A chamber 84 is defined between the annular sealing ring 65 of the valve sleeve 61 and the larger cross-sectional surface of the piston 82. The chamber 84 is connected to the $C_{v2}$ air line 17 through an connection 85.

The other or smaller cross-sectional area piston 86 on the piston unit 83 defines a valve chamber 87 which is vented to the atmosphere through an opening 88. The piston unit 83 is provided with a central bore 89 which is connected to a central valve seat 90 and over a transverse bore 91 to the valve chamber 87. The small area piston 86 of the piston unit 83 is acted upon by a spring 92 supported on a shoulder 93 within the valve housing.

A central push rod 94 extends axially from the piston 86 toward the direction of a piston 95. The piston 95 and the piston 86 define therebetween a chamber 96 which is connected by inlet connection 96' to air line 19 which conveys T pressure air. The piston 95 is urged toward the left as viewed in FIG. 2a by a spring 97 supported upon a spring plate 98 in a vented valve chamber 99. An adjustment screw 100 engages the spring plate 98 by means of which the spring force acting upon piston 95 is adjustable from the exterior of the valve 3'.

The tubular valve member 70 has an inner annular shoulder 101 within its open end 69 upon which is seated a spring 102 which acts to urge the valve member 70 in the closing direction of the valve 76,79. The tubular valve member 70 has a closed end 103 which is engageable with valve seat 90 on piston 82 to form another valve 90,103.

The tubular attachment 80 on the valve sleeve 61 has at least one opening 104 which connects the chamber 84 either over open valve 76,79, the valve sleeve chamber 74, opening 75 and annular chamber 66 with the intake connection 63 to the $C_{v1}$ air line 12 or over the open valve 90,103, bores 89 and 91, housing chamber 87 and opening 88 to the atmosphere.

The tubular valve member 70 is provided with a transverse opening 105 over which the interior of the tubular valve member 70 and the chamber 73 are connected to the inner chamber of the tubular element 80 as result of which the chamber 73 is always connected to chamber 84. By turning of the adjustment screw 62 with a simultaneous axial displacement to the left of the valve sleeve 61 which is supported upon the stepped piston unit 83, the spring 92 can be prestressed so as to urge the piston unit 83 in the direction which closes valve 90,93 and which opens valve 76,79.

Because of the connection of the air line 19 to the intake connection 96' of the relay valve 3', the valve chamber 96 is subjected to the pneumatic spring pressure T in a similar manner as the embodiment of FIG. 1. The spring 97 is prestressed by the adjustment screw 100 such that under a pneumatic spring pressure T for either a loaded or unloaded vehicle the piston 19 does not engage the push rod 94 of the piston unit 83. However, should the pneumatic spring pressure T drop to 0 because of any malfunction of the spring bellows system 5, the piston 95 then exerts a force against push rod 94 in the direction such that valve 76,79 remains in the open position against the maximum $C_{v1}$ pressure in chamber 84 such that the maximum $C_{v2}$ pressure is maintained in the relay valve 23 and thus the maximum pressure C is maintained in the brake cylinder.

Thus, as long as the pneumatic spring pressure T of a properly functioning pneumatic spring bellows system exists in the valve chamber 96, the piston 95 will have no influence on the stepped piston unit 83. Only the pneumatic spring pressure T together with the force exerted by spring 92 will act upon the smaller diameter piston 86 of the piston unit 83.

The existence of pressure T through the air line 19 thus controls valve 76,79 so that an open connection exists between line 12 and line 17. If air at pressure $C_{v1}$ is imposed on line 12 corresponding to the brake requirement signal on the analogue converter, then air under this pressure enters through inlet 63, annular chamber 66, opening 75, opening 104, and through chamber 84 into line 17. In the case of a normal service braking operation, the pressure $C_{v1}$ in chamber 84 is not sufficient to move the stepped piston unit 83 against the force of spring 92 and against the pressure T in chamber 96 in the closing direction of valve 76,79.

Should an emergency braking operation be triggered by the emergency braking valve 2 because of an incorrect or erroneous load-responsive braking signal U supplied to the analogue converter 1, the pressurized air of the reservoir 9 will be connected to line 12. In order that the brake cylinder 7 is not subjected to full braking pressure but is braked as a function or dependent on the load in order to avoid an overbraking under no-load conditions, the stepped piston unit 83 is moved in the closing direction of the valve 76,79 as a function of the pressure T in chamber 96 when a predetermined pressure is attained in chamber 84. When valve 76, 79 is closed, and pressure in line 17 cannot be increased any further so that the brake cylinder is stressed with only a limited braking pressure as compared to the maximum braking pressure. The level of the limited braking pressure depends on the vehicle load.

If the pressure $C_{v1}$ in line 12 is decreased in order to release the brake, then the pressure in chamber 74 decreases as compared with the pressure in chamber 84 and the pressure in chamber 84 also exists in chamber 73 through the tubular valve member 70. As a result, air flows out of chamber 73 over the sealing ring 72 and opening 71' into chamber 74 such that the sealing ring 72 functions to permit the uni-directional flow of air. However, a reverse connection does not exist between chamber 74 and chamber 73 over sealing ring 72 since in this direction the sealing ring acts as a check valve. As the $C_{v2}$ air is drained off from chamber 73 into chamber 74 the pressure in chamber 84 will drop to a predetermined level at which the double piston unit 83 will be moved by spring 92 and the pressure T in the direction to open the valve 76,79. With this movement of the double piston 83 the valve 90, 103 remains closed under the force of the relatively weak spring 102.

If an undesirable increase in pressure in line 17 should occur without a drawing off of $C_{v2}$ air into the $C_{v1}$ air line 12 being possible such that the pressure in the $C_{v1}$ air line is greater than the pressure $C_{v2}$ in chamber 84, then $C_{v2}$ air is drawn off so that its pressure is reduced to 0 by opening of the valve 90,103. The air is thus vented at opening 88. This venting action causes the double piston 83 to be displaced in the direction to open valve 91,103. Such an undesireable increase in pressure of the $C_{v2}$ air may occur by air entering from the exterior of the system such as, for example, by leakage through the valve 76,79 or because of thermal compression.

In the event the pressure T in line 19 should decrease to 0 because of a malfunction in the spring bellows system, spring 97 then becomes effective to move the double piston unit 83 in the direction to open valve 76,79. The pressure control valve 3' thus ceases to function and the full pressure from line 12 with the initiated rapid braking operation is transmitted to line 17 as result of which the brake cylinder is subjected to maximum braking force independent of whether the vehicle is loaded or unloaded. As discussed above with respect to FIG. 1, overbraking of the empty vehicle with decreasing T pressure is accepted for safety reasons. On the other hand, the present invention assures that a fully loaded vehicle is sufficiently braked.

Thus it can be seen that according to the present invention there is provided a pressure control valve which controls a load-responsive pressure in the brake cylinder such that in the absence or failure of a vehicle load-responsive signal and upon actuation of the emergency brake valve full braking is applied to the brake cylinder independent of the vehicle load.

It will be understood that this invention is susceptible to modification in order to adapt it to different usages and conditions, and accordingly, it is desired to comprehend such modifications within this invention as may fall within the scope of the appended claims.

What is claimed is:

1. In an analogue controlled electro-pneumatic brake particularly for rail vehicles wherein an operator selected electrical brake signal is converted into a load-responsive pneumatic braking signal, voltage-pressure transducer means for converting an electrical brake control signal into a first pneumatic control pressure signal, pressure control valve means connected by a pneumatic line to said transducer means to be controlled by said first pneumatic control pressure signal for generating a second pneumatic control pressure singal, relay valve means connected between a source of pressure fluid and at least one brake cylinder and to said pressure control valve means to receive said second pneumatic control pressure signal for regulating pressure in the brake cylinder, said brake cylinder being a spring-loaded brake cylinder, an emergency brake valve connected in the pneumatic line between said transducer means and said pressure control valve means to interrupt the pneumatic line connected between said pressure control valve means and said transducer means in response to a faulty electrical brake control signal, means for supplying a pneumatic load-responsive signal to said pressure control valve means, said pressure control valve means being monitored by said pneumatic load-responsive signal such that in response to a pneumatic load-responsive signal and a faulty electrical brake control signal a said second pneumatic pressure control signal is supplied to said relay valve means to brake the vehicle as a function of its load and to avoid overbraking, said relay valve means introducing a load-responsive residual pressure into said spring-loaded brake cylinder, only in the absence of a pneumatic load-responsive signal will said pressure control valve means supply a second pneumatic control pressure signal to said relay means in response to which said relay means independent of the vehicle load regulates the pressure in the brake cylinder to apply full braking with maximum braking force to said spring-loaded brake cylinder.

2. In an electro-pneumatic brake as claimed in claim 1 wherein said pressure control valve means has an input for said pneumatic line to receive said first control pressure signal, said input being connected to said emergency brake valve through said pneumatic line, said emergency brake valve being electromagnetic and venting said pneumatic line when there is a malfunction in the electro-pneumatic brake control.

3. In an electropneumatic brake as claimed in claim 1 wherein said pressure control valve means has a first inlet for said first control pressure signal and an outlet connected to said relay valve means, means in said pressure control valve means for defining a pneumtic path between said first inlet and said outlet, and a check valve in said pneumatic path.

4. In an electro-pneumatic brake as claimed in claim 5 wherein said check valve closing said pneumatic path in the direction from said outlet to said first inlet.

5. In an electropneumatic brake as claimed in claim 3 wherein said pressure control valve means has a second inlet connected to said vehicle load-responsive signal producing means, said pressure control valve means having a first piston having a first side acted upon by a first spring and a second side open to said second inlet so that said vehicle load-responsive signal acts upon said second side against said first spring, means for limiting the movement of said first piston when acted upon by a full-load vehicle load-responsive signal, a piston unit comprising second and third axially spaced pistons, said second piston having one side thereof open to said second inlet to be acted upon by said vehicle load-responsive signal, a servo pressure valve in said pneumatic path and acted upon by said third piston, said check valve being parallel to said servo pressure valve.

6. In an electropneumatic brake as claimed in claim 5 wherein there is a annular chamber in said pressure control valve means, said servo pressure valve comprising an axially movable valve body within said chamber and having a first valve seat thereon engageable with said third piston, said check valve comprising a sealing ring contacting said valve body and sealing said chamber.

7. In an electro-pneumatic brake as claimed in claim 6 and a second spring acting upon said valve body to urge said valve body in a direction to close said servo pressure valve.

8. In an electropneumatic brake as claimed in claim 5 wherein said piston unit has a piston rod extension engageable with said first piston such that said first piston acted upon by said first spring engages said piston rod extension to open said servo pressure valve in the absence of a vehicle load-responsive signal.

9. In an electropneumatic brake as claimed in claim 5 wherein said first spring exerts such a force that when the vehicle is operating under no-load conditions the force exerted by the vehicle load-responsive signal against said first piston is in equilibrium with the force exerted by said first spring.

10. In an electropneumatic brake as claimed in claim 1 wherein said pressure control valve means has a first inlet for said first control pressure signal and an outlet connected to said relay valve means, said pressure control valve means having a second inlet connected to said vehicle load-responsive signal producing means, means in said pressure control valve means for defining a pneumatic path between said first inlet and said outlet, said pressure control valve means having a first piston having a first side acted upon by a first spring and a second side open to said second inlet so that said vehicle load-responsive signal acts upon said second side against said first spring, a piston unit comprising second and third axially spaced pistons, said second piston having one side thereof open to said second inlet to be acted upon by said vehicle load-responsive signal, a third spring acting upon said second piston in the same direction as the vehicle load-responsive signal, an axially displaceable first valve sleeve in said pneumatic path having a portion engageable with said third piston and a second valve sleeve thereon to define a second servo pressure valve, means in said first valve sleeve for defining an opening therein, a spring-loaded second valve sleeve sealingly and axially movable within said opening and having a flange engageable with said second valve seat to define a second servo pressure valve, means for connecting an inner portion of said first valve sleeve with said first inlet opening, said second valve sleeve having a portion extending through said second valve seat and engageable with said third piston to define therewith a vent valve between the atmosphere and said outlet.

11. In an analogue controlled electro-pneumatic brake particularly for rail vehicles wherein an operator selected electrical brake signal is converted into a load-responsive pneumatic braking signal, voltage-pressure transducer means for converting an electrical brake control signal into a first pneumatic control pressure signal, pressure control valve means connected by a pneumatic line to said transducer means to be controlled by said first pneumatic control pressure signal for generating a second pneumatic control pressure signal, relay valve means connected between a source of pressure fluid and at least one direct-acting brake cylinder and to said pressure control valve means to receive said second pneumatic control pressure signal for regulating pressure in the brake cylinder, an emergency brake valve connected in the pneumatic line between said transducer means and said pressure control valve means to interrupt the pneumatic line connected between said pressure control valve means and said transducer means in response to a faulty electrical brake control signal, means for supplying a pneumatic load-responsive signal to said pressure control valve means, said pressure control valve means being monitored by said pneumatic load-responsive signal such that in response to a pneumatic load-responsive signal and a faulty electrical brake control signal a said second pneumatic pressure control signal is supplied to said relay valve means to brake the vehicle as a function of its load and to avoid overbraking, said relay valve means introducing a load-responsive control pressure into said direct-acting brake cylinder, only in the absence of a pneumatic load-responsive signal will said pressure control valve means supply a second pneumatic control pressure signal to said relay means in response to which said relay means independent of the vehicle load regulates the pressure in the brake cylinder to apply full braking with maximum braking force to said direct-acting brake cylinder.

12. In an electro-pneumatic brake as claimed in claim 11 wherein said pressure control valve means has an input for said first control pressure signal, and means in said pressure control valve means and said relay valve means for connectinng said input to the source of pressure fluid when said emergency brake valve is actuated.

13. In an electro-pneumatic brake as claimed in claim 11 wherein said pressure control valve means has a first inlet for said control pressure signal and an outlet connected to said relay valve means, means in said pressure control valve means for defining a pneumatic path between said first inlet and said outlet, and a check valve in said pneumatic path, said check valve closing said pneumatic path in the direction from said first inlet to said outlet.

* * * * *